June 21, 1927.

R. L. UHL 1,633,504

SAFETY GAS DEVICE OR COCK

Filed April 3, 1926

Robert L. Uhl
INVENTOR

BY Victor J. Evans
ATTORNEY

WITNESS:

Patented June 21, 1927.

1,633,504

UNITED STATES PATENT OFFICE.

ROBERT L. UHL, OF CHINO, CALIFORNIA.

SAFETY GAS DEVICE OR COCK.

Application filed April 3, 1926. Serial No. 99,682.

This invention relates to safety appliances for the cocks of gas lines, jets or the like, and has for its object the provision of a novel spring pressed valve device which will act automatically to close the outlet from a gas cock or the like in case the gas is left turned on at the usual valve or in case the conducting hose leading to some appliance should happen to be pulled off while the gas is still turned on.

An important object of the invention is to provide a valve device of this character which is located entirely externally of the cock and which will therefore not in any way interfere with the free passage of gas except in case of accident as mentioned.

A still further object is to provide a safety device of this character which will be simple and inexpensive in manufacture, easy to install, and use, positive and automatic in action, efficient and durable in service, and a general improvement in the art.

With the above and other objects and advantages in view, the invention consists in the details of construction and the arrangement and combination of parts to be hereinafter more fully described and claimed, and illustrated in the accompanying drawings, in which:

Figure 1:
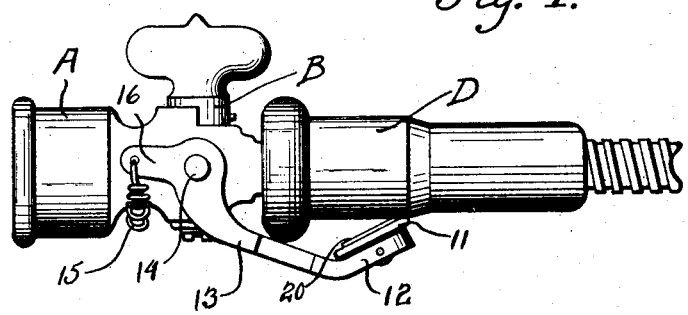
Figure 1 is a side elevation of the device showing a gas tube or pipe connected with the cock.
Figure 2:
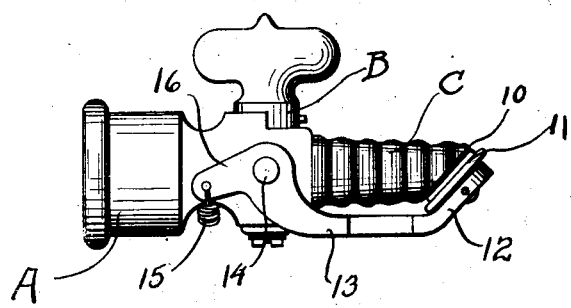
Figure 2 is a side elevation with the gas hose or pipe removed and showing the valve in closed position.
Figure 3:
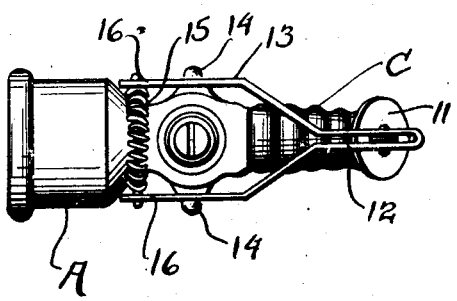
Figure 3 is an elevation taken at right angles to Figure 2.
Figure 4:
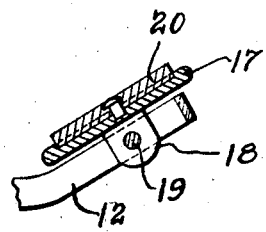
Figure 4 is a detail sectional view through the valve itself.

Referring more particularly to the drawings, the letter A designates a gas outlet connection of ordinary construction adapted to be engaged upon a supply pipe or the like, this connection being, as is customary, provided with a rotary cutoff valve B interposed between the ends, it being customary to provide one end C with ribs or corrugations by means of which a rubber hose, tube or the like indicated at D may be held properly in place.

In carrying out the present invention, the extremity of the corrugated or ribbed portion C is cut away at an incline as indicated at 10 to provide a valve seat with which cooperates a valve member 11 loosely mounted upon the angular end 12 of an arm 13 pivoted upon suitable trunnions 14 projection from opposite sides of the valve or connection, a coil spring 15 being connected with an angular extension 16 of the arm for the purpose of normally urging the valve member 11 into engagement with the inclined surface 10 constituting the seat. In actual practice, the valve 11 may comprise a plate-like member 17 carrying a lug or ear 18 pivoted at 19 upon the arm 12, the plate-like member also carrying a packing gasket 20 of rubber or other suitable material adapted to make a close fit with the inclined end 10 or seat formed at the terminal of the ribbed portion of the gas cock or connection.

In the use of the device, it will be seen that under ordinary circumstances when the hose connection or pipe D is in engagement with or mounted upon the ribbed end C of the connection or cock, the valve member 11 will be held in inoperative position, the spring 15 being under tension. In case the hose connection is pulled off or in case none has ever been applied and the cock or valve B happens to be left open, it is clear that the spring 15 will act to swing the arm or arms 13 or 12 so as to bring the valve member 11 into engagement with the inclined end 10 or seat so that the passage of gas from the device will be positively prevented. It will be observed that I have really shown two of the arm members 12 and 13, the two reference characters indicating different parts thereof, these arm members being arranged in straddling relation to and pivoted upon opposite sides of the valve or connection.

It is really believed that the construction, operation and advantages will be readily apparent to one skilled in the art without further explanation.

While I have shown and described the preferred embodiment of the invention, it should be understood that I reserve the right to make such changes in the form, construction and arrangement of parts as will not depart from the spirit of the invention or the scope of the subjoined claims.

Having thus described the invention, I claim:—

1. In a safety device of the character described, a gas outlet connection having a nose adapted to have a rubber tube engaged thereon, a substantially U-shaped arm structure straddlingly engaged upon the connection and pivoted thereto, a valve member loosely pivotally mounted on said arm structure and adapted to fit conformingly against the end of the nose, and a coil spring having its ends connected with said U-shaped arm structure and extending transversely of the connection in engagement therewith for normally urging the arm structure into certain position as to bring the valve into engagement with the nose.

2. In a safety device of the character described, a gas outlet connection having a nose adapted to have a rubber tube engaged thereon, said nose having its end cut away at an incline to constitute a valve seat, a substantially U-shaped arm structure straddlingly engaged upon the connection and pivoted thereto, a floating valve member carried by said arm structure and adapted to fit conformingly against the inclined end of the nose, extensions on said arm structure at the side of the pivot most remote from the nose, and spring means connected with said extensions and engaging the body of the connection for normally urging the arm structure into such position as to bring the floating valve member into engagement with said inclined end constituting the seat whereby flow of gas through the connection will be prevented.

In testimony whereof I affix my signature.

ROBERT L. UHL.